Feb. 20, 1968     P. J. DANCIK     3,369,610

AIRCRAFT BLADE FOLDING MECHANISM

Filed Dec. 7, 1966

INVENTOR.
PAUL JULIUS DANCIK

BY Matthew P. Lynch
Franklin ____

ATTORNEYS.

3,369,610
AIRCRAFT BLADE FOLDING MECHANISM
Paul Julius Dancik, Broomall, Pa., assignor to The Boeing Company, Seattle, Wash., a corporation of Delaware
Filed Dec. 7, 1966, Ser. No. 599,826
11 Claims. (Cl. 170—135.25)

ABSTRACT OF THE DISCLOSURE

An aircraft propelling assembly having a mechanism for positioning a pair of concentric hubs in a fixed manner for propelling an aircraft and an auxiliary mechanism adapted to cause one of the hubs to move relative to the other in order to phase or fold the blades when the aircraft is not propelled.

---

Figure 1:
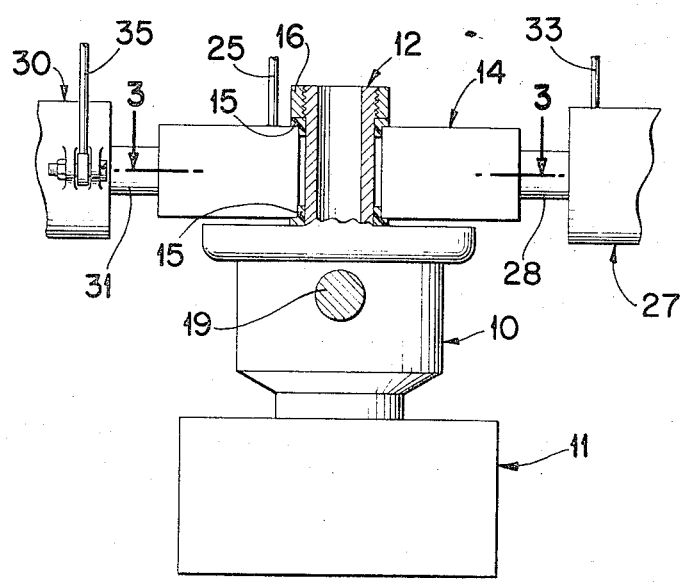

This invention relates to an aircraft propelling assembly and, more particularly, to a mechanism for phasing or folding the blades of an aircraft propelling assembly toward alignment with each other.

When parking aircraft such as covertiplanes and helicopters, for example, it is often desirable to fold the blades of the aircraft propelling assembly. In helicopters, the blades are folded over the helicopter fuselage. In convertiplanes, the tilt wings when in their tilt position may be folded with respect to the fuselage and the blades then folded or phased.

This type of operation greatly reduces the amount of aircraft storage and handling area, which is required during stowing and parking maneuvers. It also permits the aircraft to be more easily concealed. Additionally, when the aircraft is to be stored on a surface ship such as an aircraft carrier, folding of the blades on a helicopter and the blades and wings on a convertiplane enables transport of the aircraft to and from the hangar deck by elevators.

Various types of power blade folding mechanisms have previously been employed. These have included devices in which additional hinge structure is utilized with the folded portion of the blade being pivoted about the additional hinge structure. However, the use of additional hinge structure not only adds undesirable weight but also creates aerodynamic problems.

The present invention satisfactorily solves the foregoing problems by folding or phasing the blades without the requirement of any hinge connection between the rotor hub and the blades. The invention has particular utility in folding or phasing blades, which are rigidly connected to the rotor hub other than for pitch control of the blades.

Another problem in folding blades, which are subjected to pitch control, has been the disposition of the pitch linkage. Power blade folding mechanisms have required either disconnection of the pitch linkage or locking of the pitch linkage.

The present invention solves this problem by folding the blades of the aircraft without requiring either removal or disconnection of the pitch linkage or requiring locking of the pitch linkage. The present invention provides a means to phase the blades toward alignment with each other but limits the phasing movement so that it is not necessary to disconnect or remove the pitch linkage or lock the pitch linkage.

It is necessary for all of the blades of the aircraft propelling assembly to be connected to cause simultaneous rotation thereof. The present invention preferably utilizes internal connections between the blades to eliminate any undesired aerodynamic problems that would result from external connections between the blades of the aircraft propelling assembly.

An object of this invention is to provide a mechanism for folding or phasing concentrically mounted aircraft blades with respect to each other.

Another object of this invention is to provide a mechanism for folding or phasing blades of an aircraft propelling assembly in which the blades are rigidly connected to the rotor hub of the aircraft except for the pitch control of each of the blades.

A further object of this invention is to provide a mechanism that is capable of folding or phasing concentrically mounted aircraft blades without disconnecting or locking the pitch link structure of the blades.

Other objects of this invention will be readily perceived from the following description, claims and drawing.

This invention relates to an aircraft propelling assembly comprising a plurality of concentrically mounted hubs with a set of blades attached to each of the hubs with each set of the blades comprising two blades extending from the hub in opposite directions. The hubs are connected to each other by suitable means to equally angularly space the blades from each other and to permit simultaneous rotation of all of the blades. Relative movement of the hubs with respect to each other is produced by suitable means when the connecting means is disconnected whereby the sets of blades may be moved toward alignment with each other.

Figure 2:
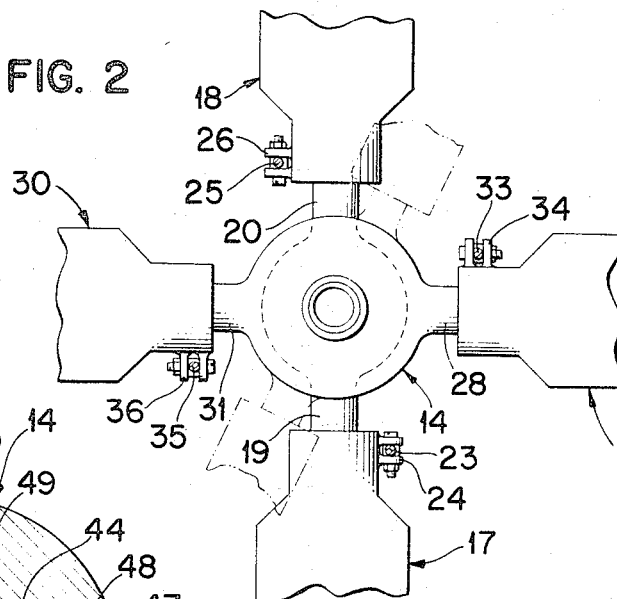
Figure 3:
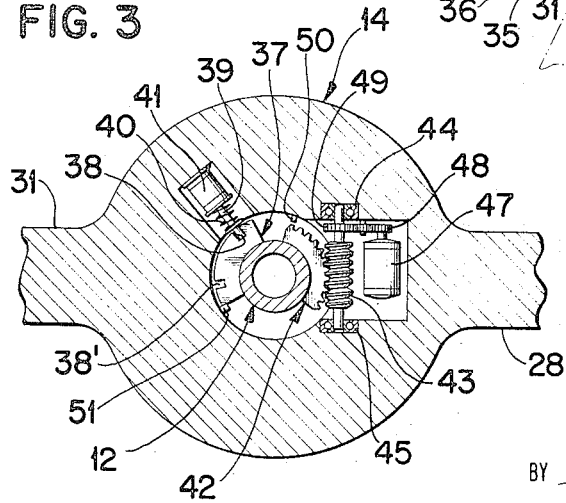

The attached drawing illustrates a preferred embodiment of the invention, in which FIGURE 1 is a side elevational view, partly in section and partly schematic, showing an aircraft propelling assembly having the blade folding mechanism of the present invention;

FIGURE 2 is a top plan view, partly in section, of the assembly of FIGURE 1; and FIGURE 3 is an enlarged sectional view of a portion of the aircraft propelling assembly taken along line 3—3 of FIGURE 1 and showing details of the folding mechanism of the present invention.

Referring to the drawing and particularly FIGURE 1, there is shown a rotor hub 10 that is adapted to be driven in the well-known manner by a motive means 11, which includes an engine and transmission. The hub 10 has a concentric extension 12 extending upwardly therefrom and formed integral therewith.

A hub 14 is rotatably mounted on the concentric extension 12 of the hub 10 through bearings 15. The upper end of the concentric extension 12 is threaded to receive a nut 16 to retain the hub 14 on the extension 12 of the hub 10.

Blades 17 and 18 are mounted on stubs 19 and 20, respectively, of the hub 10. The axes of the stubs 19 and 20 are aligned with each other and are perpendicular to the axis of rotation of the hub 10.

The blade 17 is pivotally mounted on the stub 19 through suitable bearings (not shown). Likewise, the blade 18 is pivotally mounted on the stub 20 through suitable bearings (not shown).

The pitch axis of each of the blades 17 and 18 is aligned with the axes of the stubs 19 and 20. Thus, the blades 17 and 18 are rigidly connected to the hub 10 except for pitch change due to pivotal movement about the pitch axes. Furthermore, the blades 17 and 18 form a set of blades extending in opposite directions from each other with respect to the hub 10.

Control of the pitch of the blade 17 is accomplished by a pitch link 23, which is connected to a pitch arm 24 on the blade 17. Similarly, pitch control of the blade 18 is accomplished by a pitch link 25, which is connected to a pitch arm 26 on the blade 18. The links 23 and 25 are connected in the well-known manner to a swashplate (not shown), which is preferably supported from the upper end of the concentric extension 12 of the hub 10.

A blade 27 is pivotally mounted on a stub 28 of the hub 14 through suitable bearings (not shown). A blade 30 is pivotally mounted on a stub 31 of the hub 14 through suitable bearings (not shown).

The axes of the stubs 28 and 31 are aligned with each other and are perpendicular to the axis of rotation of the hub 10. The axes of the stubs 28 and 31 also are perpendicular to the axes of the stubs 19 and 20 as shown in FIGURE 2. The stubs 28 and 31 are disposed in a different plane than the stubs 19 and 21 so that the blades 17 and 18 are disposed in a plane parallel to the plane containing the blades 27 and 30.

The pitch axis of each of the blades 27 and 30 is aligned with the axes of the stubs 28 and 31. Thus, the pitch of the blades 27 and 30 may be changed by pivoting about the stubs 28 and 31, respectively.

Control of the pitch of the blade 27 is accomplished by a pitch link 33, which is connected to a pitch arm 34 on the blade 27. A pitch link 35 is connected to a pitch arm 36 on the blade 30 for controlling the pitch of the blade 30. The pitch links 33 and 35 are connected to the same swashplate as the pitch links 23 and 25 in the well-known manner.

The hub 10 has a locking member 37 (see FIGURE 3), which is preferably formed integral with the concentric extension 12 of the hub 10. The locking member 37 has a pair of angularly spaced slots 38 and 38' formed therein.

When the locking member 37 is formed integral with the extension 12 of the hub 10, the hub 14 has a hollow portion in which a pin 39 is disposed for cooperation with the slots 38 and 38' in the locking member 37. The pin 39 is resiliently biased by a spring 40 into one of the slots 38 and 38' in the locking member 37. A solenoid 41, which is mounted within a recess or receptacle in the hub 14, removes the pin 39 from the slot 38 or 38' whenever the solenoid 41 is energized.

When the pin 39 is disposed in the slot 38 as shown in FIGURE 3, the blades 17, 18, 27, and 30 are spaced equal angular distances from each other as shown in solid lines in FIGURE 2. When the pin 39 is disposed in the slot 38 of the locking member 37, the locking member 37 abuts against a non-jamming lug 51 on the hub 14 so that energization of the motive means 11 will cause simultaneous rotation of all of the blades about the axis of the concentric hubs 10 and 14. Thus, an operative connection is provided between the hubs 10 and 14.

The hub 10 also has a gear sector 42, which is preferably disposed on the concentric extension 12 of the hub 10. The teeth of a worm gear 43 mesh with the teeth of the gear sector 42 for causing relative movement between the hubs 10 and 14 when the worm gear 43 is rotated.

The worm gear 43 is rotatably mounted within a receptacle in the hub 14 when the gear sector 42 is disposed on the extension 12 of the hub 10. The worm gear 43 is rotatably mounted in a pair of bearings 44 and 45 in the hub 14.

An electric motor 47 is mounted on the hub 14 and has a gear 48 attached to one end of its motor shaft. The gear 48 meshes through a gear train with a gear 49 on the shaft of the worm gear 43 whereby rotation of the worm gear 43 occurs whenever the electric motor 47 is energized.

Of course, the electric motor 47 cannot cause rotation of the hub 14 with respect to the hub 10 until the pin 39 is removed from the slot 38 of the locking member 37. This can occur only by energization of the solenoid 41. Thus, simultaneous energization of the solenoid 41 and the electric motor 47 will start folding or phasing of the blades 27 and 30 due to rotation of the hub 14.

The amount of rotation of the hub 14 with respect to the hub 10 is limited by engagement of a lug 50 on the rotor hub 14 with a portion of the locking member 37 on the hub 10. This engagement of the lug 50 with the locking member 37 determines the amount of folding of the blades 27 and 30.

When the movement of the hub 14 by the electric motor 47 is stopped due to the lug 50 engaging the locking member 37, the pin 39 of the hub 14 will be aligned with the slot 38' in the locking member 37. Thus, de-energization of the solenoid 41 allows the spring 40 to urge the pin 39 into the slot 38'. As a result, the hubs 10 and 14 are locked together in their folded position.

The lug 50 is positioned so that the maximum amount of movement of the set of blades 27 and 30 on the hub 14 is such that the pitch links 33 and 35 need not be disconnected nor need the pitch structure be locked. The maximum amount of movement of the set of blades 27 and 30 on the hub 14 that will not cause any disconnection of the pitch links 33 and 35 is approximately 70° as shown in phantom in FIGURE 2. Since the set of blades 27 and 30 on the hub 14 is almost in alignment with the set of blades 17 and 18 on the hub 10, the amount of space required for the blades is substantially reduced.

Considering the operation of the blade folding or phasing mechanism of the present invention, the hubs 10 and 14 are locked or connected to each other in their normal operating relation in which the blades 17, 18, 27, and 30 are equally angularly spaced from each other through the pin 39 being disposed in the slot 38 in the locking member 37. In this arrangement, the locking member 37 abuts against the lug 51 on the hub 14 so that all of the blades are rotated simultaneously due to the motive means 11 driving the hub 10 while full operating torque is transmitted from the hub 10 to the hub 14 through the locking member 37 engaging the lug 51. There are secondary driving connections between the hubs 10 and 14 through the pin 39 being disposed in the slot 38 in the locking member 37 and the teeth of the gears 42 and 43 engaging each other.

When it is desired to fold the blades with respect to each other, the solenoid 41 is energized to remove the pin 39 from the slot 38 of the locking member 37. At the same time, the electric motor 47 is energized to cause movement of the hub 14 with respect to the hub 10. The hub 10 is prevented from movement because it is connected to the transmission and engine of the motive means 11.

The amount of movement of the blades 27 and 30 is limited to approximately 70° so that the pitch links 33 and 35 induce some pitch change to the blades 27 and 30 but do not have to be disconnected. Of course, the pitch of the blades 27 and 30 will increase due to induced motions by the pitch links 33 and 35 if the pitch links 33 and 35 are attached to the leading edges of the blades 27 and 30 as shown in FIGURE 2. However, if the pitch links 33 and 35 should be connected to the trailing edges of the blades 27 and 30, respectively, then the pitch links 33 and 35 will induce the blades 27 and 30 to decrease pitch when the hub 14 is rotated with respect to the hub 10.

When rotation of the hub 14 by the electric motor 47 is stopped by the lug 50 on the hub 14 engaging the locking member 37 on the hub 10, the pin 39 will now be aligned with the slot 38' of the locking member 37. Accordingly, de-energization of the solenoid 41 results in the spring 40 urging the pin 39 into the slot 38'. As a result, the two rotor hubs 10 and 14 are locked to each other to prevent any inadvertent movement of the hub 14 from its folded or phased position. Of course, the electric motor 47 also is de-energized when the lug 50 engages the locking member 37.

Both the solenoid 41 and the electric motor 47 are preferably simultaneously and automatically de-energized when the lug 50 engages the locking member 37. This can be accomplished by cooperating electrical contacts (not shown) on the lug 50 and the locking member 37, for example.

When it is desired to return the blades 27 and 30 to their operating position with respect to the blades 17 and 18, the solenoid 41 is again energized to remove the pin 39 from the slot 38' of the locking member 37. The direction of rotation of the electric motor 47 is reversed to cause rotation of the worm gear 43 in the opposite direction whereby the blades 27 and 30 now move from their phased or folded position to the operating position (solid line position of FIGURE 2) in which the blades 17, 18, 27, and 30 are all equally angularly spaced from each other.

Rotation of the hub 14 by the motor 47 continues until the lug 51 on the hub 14 engages the locking member 37 to stop rotation of the hub 14. At this time, the motor 47 is de-energized.

When the hub 14 is stopped from rotating by the lug 51 engaging the locking member 37, the pin 39 is now aligned with the slot 38 of the locking member 37 as shown in FIGURE 3. De-energization of the solenoid 41 results in the spring 40 urging the pin 39 into the slot 38 whereby the hubs 10 and 14 are connected or locked to each other to equally angularly space all of the blades 17, 18, 27, and 30 from each other.

Both the solenoid 41 and the electric motor 47 are preferably simultaneously and automatically de-energized when the lug 51 engages the locking member 37. This can be accomplished by cooperating electrical contacts (not shown) on the lug 51 and the locking member 37, for example.

While the gear sector 42 and the locking member 37 have been described as being mounted on the extension 12 of the hub 10, it should be understood that these members could be mounted on the hub 10. Of course, in such an arrangement, a depending housing would be necessary at the bottom of the hub 14 to support the electric motor 47, the gear train, and the worm gear 43. Likewise, the pin 39 would have to be mounted to protrude downwardly from the bottom of the hub 14 for disposition within the slots 38 and 38' of the locking member 37.

While the worm gear 43, the gear train, and the electric motor 47 have been described as being mounted on the hub 14 and the gear sector 42 as being mounted on the hub 10, it should be understood that these parts could be reversed. Similarly, the locking member 37 could be mounted on the hub 14 and the pin 39 and its associated structure mounted on the hub 10 if desired.

While the pin 39 has been described as being moved in one direction by the solenoid 41 and in the opposite direction by the spring 40, it should be understood that any other suitable means could be employed. For example, a mechanical or hydraulic arrangement could be employed to move the pin 39 into and out of the slots 38 and 38' of the locking member 37.

While two sets of blades have been shown as being moved with respect to each other, it should be understood that more than two sets of blades could be employed in the aircraft propelling assembly of the present invention. Of course, the second movable set of blades would not be capable of being rotated as far as the first set of movable blades but sufficient movement could occur to reduce the amount of space required by the blades of the aircraft propelling assembly.

An advantage of this invention is that the blades of the aircraft propelling assembly may be folded without any interference with the pitch links. Another advantage of this invention is that the folding mechanism does not require any type of hinge connection or break joint at the hub end of the blade. A further advantage of this invention is that folding of the blades may be accomplished relatively quickly. Yet another advantage of this invention is that only one motor is required to fold four blades instead of a separate motor for each folded blade. Still another advantage of this invention is that the required storage space for the aircraft is reduced through use of the folding mechanism of the present invention. A still further advantage of this invention is that the blades may be folded without requiring any locking of the pitch controls.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. An aircraft propelling assembly comprising a plurality of concentrically mounted hubs, a set of blades attached to each of said hubs, each set of said blades comprising two blades extending from said hub in opposite directions, means to connect said hubs to each other to equally angularly space said blades from each other and to permit simultaneous rotation of all of said blades, motive means adapted to simultaneously rotate said blades and phasing means to cause relative movement of said hubs with respect to each other when said connecting means is disconnected whereby said sets of blades may be moved toward alignment with each other independently of said motive means.

2. The assembly according to claim 1 including means to lock said hubs to each other after said sets of blades have been moved toward alignment with each other by said phasing means.

3. The assembly according to claim 1 in which each of said blades is mounted on said hub for pivotal movement about its pitch axis and each of said blades has pitch control means attached thereto to cause pivotal movement of said blade about its pitch axis to change the pitch angle of said blade.

4. The assembly according ot claim 1 in which each set of said blades is disposed in a different parallel plane.

5. The assembly according to claim 1 in which said hubs comprise a first hub adapted to be connected to said motive means and a second hub concentrically mounted on said first hub, said hub phasing means including means connected to one of said hubs for causing said one hub to move relative to the other of said hubs.

6. The assembly according to claim 1 in which said hubs comprise a first hub adapted to be connected to said motive means and a second hub concentrically mounted on said first hub, said hub phasing means including a first gear connected to one of said hubs, a second gear connected to the other of said hubs and meshing with said first gear on said one hub, and means on said other hub for driving said second gear on said other hub to cause said other hub to move relative to said one hub.

7. The assembly according to claim 6 in which said driving means includes an electric motor mounted on said other hub.

8. The assembly according to claim 5 in which said hub connecting means includes a locking member on one of said hubs, said locking member having at least one slot therein, and movable means associated with the other of said hubs and adapted to be disposed in said slot in said locking member to connect said hubs to each other to equally angularly space said blades from each other.

9. The assembly according to claim 8 in which said locking member has two slots with the second of said slots receiving said movable means to lock said hubs to each other after said hub relative moving means has completed relative movement of said hubs to move said sets of blades toward alignment with each other.

10. The assembly according to claim 8 in which said other hub has means thereon to engage said locking member to permit simultaneous rotation of all of said blades when said movable means is disposed in said slot.

11. The assembly according to claim 9 in which said other hub has means thereon to stop movement of said other hub when said relative moving means moves said sets of blades toward alignment with each other.

References Cited

UNITED STATES PATENTS

| | | | |
|---|---|---|---|
| 2,126,221 | 8/1938 | Sessums | 170—135.25 |
| 2,628,792 | 2/1953 | Griffith | 244—7 |
| 3,261,572 | 7/1966 | Gorton | 244—7 |

FOREIGN PATENTS 509,694    8/1920    France.

EVEETTE A. POWELL, JR., *Primary Examiner.*